July 5, 1949.　　　C. L. MORRIS　　　2,475,333
HELICOPTER
Filed March 27, 1945

C. L. MORRIS
INVENTOR
BY *Gifford J. Holmes*
AGENT

Patented July 5, 1949

2,475,333

UNITED STATES PATENT OFFICE 2,475,333

HELICOPTER

Charles L. Morris, Stratford, Conn., assignor to United Aircraft Corporation, East Hartford, Conn., a corporation of Delaware Application March 27, 1945, Serial No. 585,061

6 Claims. (Cl. 170—160.55)

The present invention relates to helicopters and more particularly to means for inhibiting flapping of rotor blades for certain speeds of the rotors thereof.

When helicopters of the type having freely hinged blades are brought to rest and the rotor is slowed down, gusts of wind can act upon the blades to flap them. If the wind velocity is high, such flapping may damage the blades or other parts of the aircraft. However, when the helicopter is in flight, the flapping of the blades must be unrestrained to prevent undesirable actions resulting from gyroscopic and transverse moments (caused by the difference in air speed of advancing and retreating blades), gusts of wind, and the like.

It is an object of the present invention to provide an improved blade stop for locking the blade against flapping either upwardly or downwardly when the blade is slowed down to a predetermined degree.

Another object is to provide a toggle joint device solidly pivotally connected to the rotor hub at one end and to the rotor blade at its other end with means for locking and unlocking the same in response to the speed of rotation of the rotor.

The foregoing and other objects will be in part obvious or pointed out in the following specification and claims.

Figure 1:
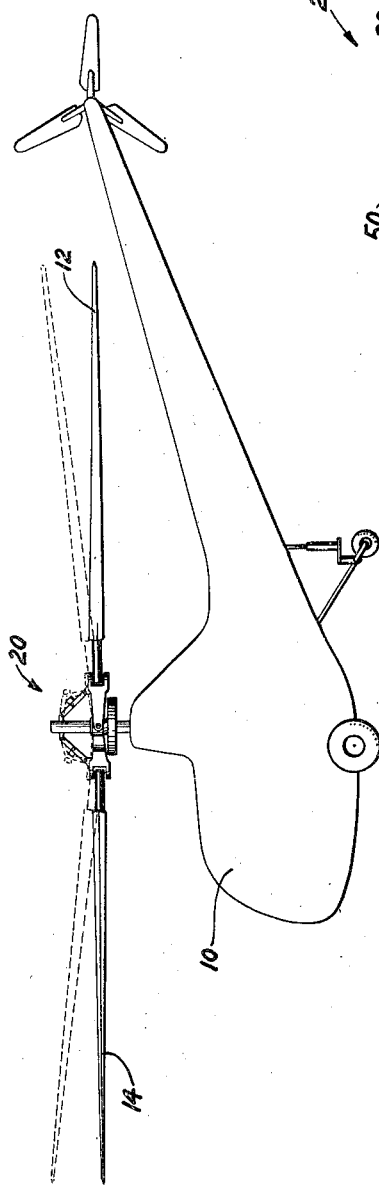
Fig. 1 is a side view of a helicopter incorporating my invention.

In Fig. 1 a helicopter 10 has rotor blades 12 and 14 which upon rotating support the helicopter 10 in the air, and in so doing may flap upwardly to the dotted line positions. Means for providing a droop stop and for locking the blades in the lower position against upward flapping movement are provided at 20 and are constructed and arranged to lock the blades in the position shown in solid lines when the rotor blades are turning slowly, for example below 100 R. P. M., and are adapted to yield to permit the blades to flap upwardly when the speed of rotation of the rotor exceeds 100 R. P. M.

Figure 2:
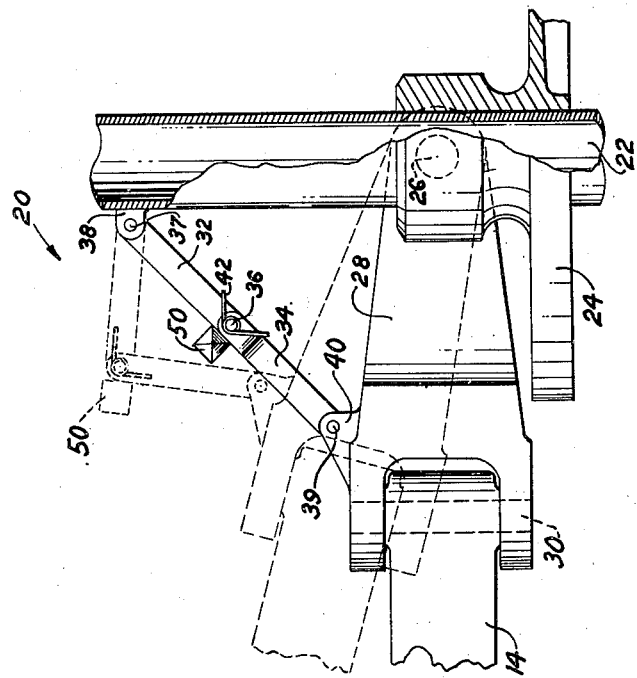
Fig. 2 is a detail view of the locking mechanism.

As shown in Fig. 2, a drive shaft 22 turns a plate 24 which on its far side has means mounting a pivot 26 that secures a drag hinge 28 for mounting the wing 14 upon a pivot 30. The drag hinge 28 can pivot upwardly around the pivot 26 as the aerodynamic action upon the blade 14 causes it to rise and to fall.

A two-way stop, or locking mechanism 20 is made up of a toggle joint comprising members 32 and 34 pivotally joined upon a pin 36. The members 32 and 34 will pivot at their ends upon a pivot 37 in a lug 38 carried by the shaft 22 and a pivot 39 in a lug 40 carried by the drag hinge 28. A spring 42 is wrapped around the pivot 36 and lies over the outside edges of the members 32 and 34. The bias of the spring 42 is such as to urge the members 32 and 34 toward the straightened position shown in the drawing against a combined stop and weight 50 which is rigidly secured to link 34 and in the straightened solid line position of the toggle (Fig. 2) forms a stop against which link 32 abuts. With the members in this position, the drag hinge 28 is locked against upward movement by the toggle joint 20 and cannot move downwardly because the toggle joint 20 is fully extended. Thus with the toggle joint 20 in the position shown in solid lines the blade 14 will be kept in the solid line position shown in Fig. 1.

When the helicopter is in flight it is desirable to have the rotor blades 12 and 14 unlocked so that the blades will be free to flap upwardly and downwardly to eliminate the effect of gyroscopic movements and the effect of transverse movements caused by the different relative wind velocity between advancing and retreating blades. For flight conditions the helicopter and its rotor are so designed (in the example given here) that the rotor structure will turn in excess of 100 R. P. M. The weight 50 is secured to toggle link 34 adjacent the pivot joint 36 of the toggle 20 so that centrifugal force acting on the weight at 100 R. P. M. will cause the same to overcome the tension of the spring 42 and break the toggle joint 20 in the direction of the dotted lines shown in Fig. 2. With the toggle joint 20 broken the blade 14 will be free to flap up and down in response to variations of force acting upon the blade.

In operation, when the helicopter 10 alights upon a landing surface the rotor blades 12 and 14 will be slowed down. When the speed of rotation falls below 100 R. P. M. the centrifugal force acting upon the weight 50 will be reduced to such an extent that the spring 42 will move the toggle member to its straightened position in which weight 50, functioning as a stop, engages link 32. The decreased lift of the rotor blades at this time will permit the blades to hang lower due to gravity to aid in this operation.

While I have shown a preferred embodiment of my invention, it will be understood that modified structures and different arrangements of parts could be made to accomplish substantially the same function as performed by my device. Therefore I wish not to be limited in my invention only to that form shown and described but by the scope of the following claims.

I claim:

1. In a helicopter including a rotatable hub and a blade pivoted to said hub for vertical movement, means operable in response to the speed of rotation of said hub for limiting movement of said blade comprising, a toggle joint connected between said hub and said blade and movable between a straightened locked position and a broken unlocked position concurrently with vertical movement of said blade, biasing means urging said joint to the locked position, and centrifugal force responsive means for overcoming said biasing means when said hub attains a predetermined speed to unlock said joint.

2. In a helicopter including a rotatable hub and a blade pivoted to said hub for vertical movement, means operable in response to the speed of rotation of said hub for limiting movement of said blade comprising, a two-link toggle connecting said hub and blade and adapted to be moved by flapping movements of said blade between a straightened position in which said blade is locked against upward movement and a broken position in which said blade is free to flap upwardly, and centrifugal force responsive means for breaking said toggle.

3. In a helicopter including a rotatable hub and a blade pivoted to said hub for vertical movement, means operable in response to the speed of rotation of said hub for limiting movement of said blade comprising, a two-link toggle connecting said hub and blade adapted to be moved by flapping movements of said blade between a straightened position in which said blade is locked against upward movement and a broken position in which said blade is free to flap upward, stop means for limiting the collapse of said straightened toggle in one direction, means constantly biasing said toggle against said stop means, and centrifugal force responsive means for overcoming said biasing means to collapse said toggle in the other direction when said hub attains a predetermined speed.

4. In a helicopter including a rotatable hub and a blade pivoted to said hub for vertical movement, means operable in response to the speed of rotation of said hub for limiting movement of said blade comprising, a two-link toggle connecting said hub and blade adapted to be moved by flapping movements of said blade between a straightened position in which said blade is locked against upward movement and a broken position in which said blade is free to flap upwardly, a stop element carried by one of said links and engageable with the other link when said toggle is moved into a substantially straightened position, means constantly biasing said toggle link against said stop element and means responsive to centrifugal force for overcoming said biasing means when said hub attains a predetermined angular speed.

5. In a helicopter rotor having a hub and a blade, pivot means for connecting said blade and hub providing freedom for upward and downward flapping movements of said blade, droop stop means comprising a toggle having two links pivotally connected at their adjacent ends, one link of said toggle having a pivotal connection at its free end with said blade at a point spaced from said pivot means and said other link having its free end pivotally connected with said hub at a point above said pivot means, abutment means for stopping said toggle in a substantially straightened position in which said blade is locked against upward movement, and means responsive to a predetermined speed of said hub for breaking said toggle to release said blade.

6. In a helicopter rotor having a hub and a blade, pivot means for connecting said blade and hub providing freedom for upward and downward flapping movements of said blade, droop stop means comprising a toggle including two links pivotally connected at their adjacent ends, one of said links having a pivotal connection at its free end with said blade at a point spaced from said pivot means and the other link having its free end pivotally connected with said hub at a point above said pivot means, abutment means for stopping said toggle in a substantially straightened position in which said blade is locked against upward movement, means constantly biasing said toggle into engagement with said abutment means, and means responsive to a predetermined speed of said hub for breaking said toggle against the action of said biasing means to release said blade.

CHARLES L. MORRIS.

REFERENCES CITED

The following references are of record in the file of this patent:

UNITED STATES PATENTS

| Number | Name | Date |
|---|---|---|
| 556,237 | Allman | Mar. 10, 1896 |
| 867,273 | Holmes | Oct. 1, 1907 |
| 1,927,966 | Vaughn | Sept. 26, 1933 |
| 2,151,215 | Larson | Mar. 21, 1939 |
| 2,318,260 | Sikorsky | May 4, 1943 |
| 2,380,581 | Prewitt | July 31, 1945 |
| 2,396,038 | Bossi | Mar. 5, 1946 |